US012469327B1

(12) United States Patent
Gupta et al.

(10) Patent No.: US 12,469,327 B1
(45) Date of Patent: Nov. 11, 2025

(54) METHOD FOR RESIZING AN IMAGE

(71) Applicant: IDENTY INC., Dover, DE (US)

(72) Inventors: Hardik Gupta, Jabalpur (IN); Marta Garcia Gomar, Madrid (ES); Daniel Erro, Madrid (ES)

(73) Assignee: Identy Inc., Dover, DE (US)

( * ) Notice: Subject to any disclaimer, the term of this patent is extended or adjusted under 35 U.S.C. 154(b) by 0 days.

(21) Appl. No.: 18/905,927

(22) Filed: Oct. 3, 2024

(30) Foreign Application Priority Data

Aug. 8, 2024 (EP) ..................................... 24382893

(51) Int. Cl.
*G06V 40/12* (2022.01)
*G06V 10/32* (2022.01)

(52) U.S. Cl.
CPC .......... *G06V 40/1359* (2022.01); *G06V 10/32* (2022.01)

(58) Field of Classification Search
CPC ............... G06V 10/32; G06V 40/1359; G06V 40/12–1394
See application file for complete search history.

(56) References Cited

U.S. PATENT DOCUMENTS

| 2011/0044513 A1* | 2/2011 | McGonagle | ....... G06V 40/1365 382/124 |
| 2016/0232401 A1* | 8/2016 | Hoyos | ................ G06V 40/1365 |
| 2016/0379038 A1* | 12/2016 | Vural | ................... G06V 10/993 382/125 |
| 2018/0165508 A1 | 6/2018 | Othman et al. | |
| 2018/0225494 A1* | 8/2018 | Rhee | .................. G06V 40/1365 |
| 2019/0362130 A1 | 11/2019 | Othman et al. | |

OTHER PUBLICATIONS

The Extended European search report for EP Application No. 24382893.6, dated Jan. 8, 2025, 9 pages.
Kunsuk Siwakun et al: "Finger Photo Rescaling for Interoperability of Touchless and Touch-based Fingerprint Verification", 2023 17th International Conference on Signal-Image Technology & Internet-Based Systems (SITIS), IEEE, Nov. 8, 2023 (Nov. 8, 2023), pp. 168-175, XP034575095, DOI: 10.1109/SITIS61268.2023.00033.
Priesnitz Jannis et al: "An overview of touchless 2D fingerprint recognition", EURASIP Journal on Image and Video Processing, vol. 2021, No. 1, Dec. 1, 2021 (Dec. 1, 2021), p. 8, XP055868836, DOI: 10.1186/s13640-021-00548-4 Retrieved from the Internet: URL:https://link.springer.com/content/pdf/ 10.1186/s13640-021-00548-4.pdf> * Section 7.4 *.

* cited by examiner

*Primary Examiner* — Premal R Patel
(74) *Attorney, Agent, or Firm* — Lowenstein Sandler LLP

(57) ABSTRACT

Method for resizing an image, the method comprising the steps: obtaining an image of a user comprising at least one biometric identifier, wherein the biometric identifier comprises a plurality of biometric characteristics; determining a first frequency of at least part of the plurality of the biometric characteristics in the image; determining a second frequency based on the first frequency and a property of the biometric identifier; resizing the image based on a ratio of the first and the second frequency; obtaining a resized image.

20 Claims, 5 Drawing Sheets

METHOD FOR RESIZING AN IMAGE

RELATED APPLICATIONS

This application claims the benefit under 35 U.S.C. 119(a) of EP Patent Application 24383893.6, filed Aug. 8, 2024, which is incorporated by reference herein.

TECHNICAL FIELD

The present disclosure relates to a method for resizing an image of a user comprising at least one biometric identifier and a computing device comprising a processor and a storage device on which to implement the method.

BACKGROUND

Some methods for resizing images are commonly known in the art.

Resizing an image comprising a biometric identifier is, for instance, of relevance when the biometric identifier comprised in the image is used for granting access to security relevant data or applications. In order to obtain a reliable comparison result between a biometric identifier and a reference biometric identifier, the image comprising the biometric identifier and specifically the biometric identifier has to be resized to a resolution that matches the resolution of the reference biometric identifier. Reference biometric identifiers typically show a standard reference resolution, such as 500 dots per inch ("dpi") or any other standard resolution.

While conventional fingerprint scanners, such as contact scanners, generally directly obtain images of a user's fingerprint with the specific standard reference resolution, the images taken of the biometric identifier by a conventional camera of devices, such as mobile phones or tablets, may be of varying resolution depending on the employed camera and the distance between camera and biometric identifier. Therefore, before being compared to the reference biometric identifier, in order to obtain a reliable comparison result, the images have to be resized. Even though there are methods known in the art for resizing images comprising a biometric identifier, these methods do not resize the images with the required accuracy that would allow for a reliable comparison between the reference biometric identifier and a reliable identification of a user.

In identification applications, the input biometric identifier is generally compared to a large number of entries in a remote dataset. In this case, it is, however, not possible to resize the input image with respect to each of those entries. Consequently, the image has to be resized without having an accessible reference.

One of the simplest strategies applied in conventional systems is assuming that fingers/palms have a common width; under this assumption, the captured image is resized so that the width of the print matches the specified value or values (the value could be finger-dependent, for instance). This solution is not ideal as (i) finger width is heterogeneous across users and (ii) it does not work when the finger of interest is partially occluded by another-which typically happens when the mobile capturing process is designed to be unconstrained for a better usability. Another common strategy of conventional systems is assuming a universal ridge frequency and scaling the touchless capture accordingly. This approach is more tolerant to occlusion, but there are still some users exhibiting atypical ridge frequencies. Therefore, as a counter measure for those outliers, some conventional approaches proposed to modify the size by +15% and -15% and retry in case the first attempt failed. The problem of this multi-attempt approach is that the price of remote matching services increases proportionally to the number of attempts, so it is not always affordable. Resizing methods based on or related to minutiae triangulation, as implemented in some conventional systems, only apply when the reference print is known. Finally, while some conventional systems use spatial transformers with scale adjustment capabilities to resize images automatically, this is only effective when the processing pipeline includes a specific type of matcher that converts both probe and reference images to embeddings, not for any third-party matcher.

BRIEF DESCRIPTION OF THE DRAWINGS

Embodiments of the present disclosure are illustrated by way of example, and not by ay of limitation, in the figures of the accompanying drawings.

DETAILED DESCRIPTION

Figure 1A:
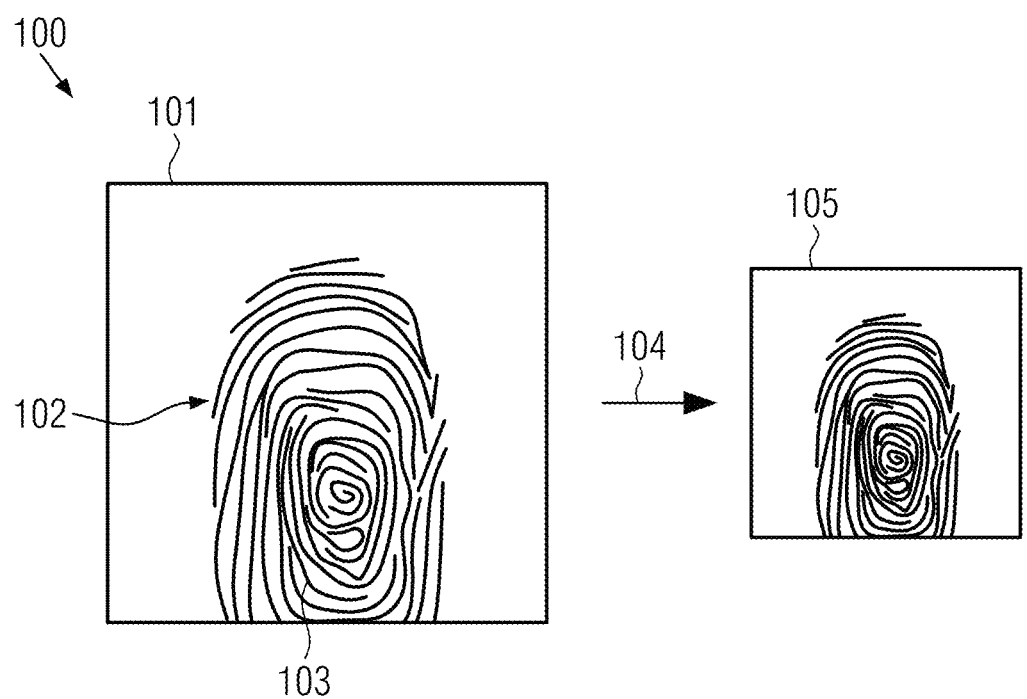
FIG. 1a shows an image that is resized into a resized image, according to an embodiment.

Aspects of the present disclosure provide a method and a computing device that allow, for a variety of different users, the highly accurate resizing of an image comprising at least one biometric identifier, in order to facilitate a reliable identification of the users by the resized biometric identifier.

Aspects of the present disclosure describe a method for resizing an image and the computing device on which to implement the method.

According to the present disclosure, a method for resizing an image is provided, wherein the method comprises the steps: obtaining an image of a user comprising at least one biometric identifier, wherein the biometric identifier comprises a plurality of biometric characteristics; determining a first frequency of at least part of the plurality of the biometric characteristics in the image; determining a second frequency based on the first frequency and a property of the biometric identifier; resizing the image based on a ratio of the first and the second frequency; obtaining a resized image.

The first frequency can be a frequency that is measured based on the plurality of biometric characteristics comprised in the image. The first frequency can be a spatial frequency. The second frequency can be a frequency that is predicted based on the first frequency and a property of the biometric characteristic.

Optionally, the method can comprise, before determining the first frequency, resizing the image so that the width of the biometric identifier equals a predefined value, wherein the predefined value can deviate from a target image resolution by a factor x, wherein x can be 1.10, 1.05, 1.02, 1.01, 0.99, 0.98, 0.95, 0.9 or any other factor.

The method can be computer-implemented and is preferably completely executed inside a computer upon obtaining the image. Obtaining the image may be user-driven or user-initiated.

The biometric identifier can be any biometric identifier which allows for the identification of a user. For instance, the biometric identifier can be a fingerprint and the biometric characteristic a fingerprint ridge. The biometric identifier can, however, also be a palm of a hand and the biometric characteristic a minutiae of the palm. Optionally, it can be provided that determining the first frequency of at least part of the plurality of the biometric characteristics in the image is based on a Fourier transformation on at least part of the image or based on a density of the at least part of the biometric characteristics in the image. Alternatively, also other approaches for determining the first frequency, such as autocorrelation across a direction of maximal variability or mean subtraction followed by zero-crossing count may be employed.

The just mentioned methods for determining the first frequency are to be considered exemplary and not limiting. Also any other suitable method for determining a frequency of the biometric characteristics in the image is conceivable.

For instance, a spatial periodicity of features in the image, such as the biometric characteristic, can be determined by means of the first frequency. If the features in the image show more than one spatial periodicity, the first frequency may comprise more than one frequency. This can, for instance, be achieved based on the Fourier transformation, which is described as an example above. The Fourier transformation can be a 2D-Fourier transformation.

For instance, if the biometric characteristics are distributed across the image with a specific periodicity, i.e., the biometric characteristics are separated from each other in the image by a certain distance, the first frequency, which can, for instance, be determined based on the Fourier transformation or any other suitable method, relates to this certain discrete distance. If the biometric characteristics are distributed in the image with more than one specific periodicity, which may be the case when, for instance, a first group of biometric characteristics is separated from each other by a first distance and a second group of biometric characteristics is separated from each other in the image by a second distance, the first frequency may also comprise more than one frequency, whereby each frequency relates to one of the two specific distances between the biometric characteristics. For instance, if the image comprises n groups of biometric characteristics, whereby for each of the n groups, the biometric characteristics are separated from each other by a specific distance, whereby n is a positive integer number, the first frequency may comprise n frequencies, whereby each of the frequencies relates to a distance that is characteristic to one of the n groups.

The above-described density of the at least part of the biometric characteristics can be understood as a number of biometric characteristics comprised in a section of the image normalized to the size of the section of the image. The section of the image can thereby comprise the whole image or only part of the image. The size of the image may, for instance, be provided in pixels.

The property of the biometric identifier can, for instance, be a dimension of the biometric identifier or be related to a dimension of the biometric identifier. The property of the biometric identifier can also comprise information about the user the biometric identifier is being associated with. The information can, for instance, comprise information about a gender, an age, and/or an ethnicity of the user. The property of the biometric identifier is, however, not limited to the just mentioned examples and can also comprise any other user related information. The property can also be more than one property.

With the method according to the present disclosure, an image comprising at least one biometric identifier can be resized with high accuracy to an arbitrary resolution. This specifically facilitates resizing the image comprising the biometric identifier with high accuracy to a target image resolution, such as a target resolution of a reference biometric identifier, which may have been obtained by a standard biometric identifier capturing device. The accurate resizing of the image in turn allows for a reliable comparison between the biometric identifier of the resized image and the reference biometric identifier and a reliable identification of the user based on the comparison result.

In an embodiment, the biometric identifier is a fingerprint and the biometric characteristic is a fingerprint ridge. Fingerprint ridges are typically distributed over the fingertip with a certain periodicity, meaning that two neighboring fingerprint ridges are separated by a specific distance from each other. Fingerprint ridges are thus particularly suited for resizing an image to a specific target image resolution.

It can be provided that obtaining the image of the user further comprises determining a binary image of the image of the user and determining the first frequency on the binary image. By determining the binary image, a contrast of the image can be increased, which in turn allows for determining the first frequency with higher accuracy and allows for a more accurate resizing of the image as well as a more accurate matching of the frequency.

It can also be provided that determining the second frequency comprises calculating a regression function of the first frequency and the property of the biometric identifier. By determining the second frequency by calculating a regression function of the first frequency and the property of the biometric identifier, the accuracy of the resized image can be further increased, as possible errors in the determined first frequency can be corrected and a precise prediction of the frequency (which is predicted and approximated by the second frequency) that would have been measured on an image captured under reference conditions can be obtained.

In an embodiment, it can be provided that determining the first frequency comprises decomposing the image in n×m blocks. By decomposing the image in n×m blocks, it can be provided that also, should the biometric characteristics have an irregular form factor, such as a form factor that deviates from a straight line, the first frequency can be determined with sufficient accuracy. Specifically, by dividing the image into a number of sufficiently small blocks, biometric characteristics with an irregular form factor, such as fingerprint ridges, can be decomposed such that a part of the biometric characteristic comprised in a block can be approximated by a straight line, which facilitates for a more precise determination of the first frequency. Furthermore, by decomposing the image into blocks, the local frequency, which may vary between different blocks, can be locally measured.

It can also be provided that determining the first frequency further comprises determining a sub-frequency for at least one of the blocks and averaging over the determined at least one sub-frequency to obtain an average sub-frequency. By determining the sub-frequency for each of the blocks and averaging over the sub-frequency, the first frequency can be determined with further increased high accuracy and possible errors in the determination process can be reduced. Optionally, it can be provided that determining the first frequency further comprises determining a sub-frequency for at least one of the blocks based on a Fourier transformation on the at least one block or based on a density of at least part of the biometric characteristics comprised in the at least one block, and averaging over the determined at least one sub-frequency to obtain an average sub-frequency. As already described above in the context of the first frequency, also any other suitable method for determining a frequency may be used for determining the at least one sub-frequency.

It can furthermore be provided that averaging comprises associating each of the determined at least one sub-frequency with a weight and averaging over the at least one sub-frequency based on the associated weight, wherein optionally the weight is determined based on a mean pixel intensity of the respective block. By associating each of the blocks with a weight and averaging based on the weight, the accuracy of the determined first frequency can be further increased. For instance, blocks with a poor image quality, for which the sub-frequency can only be determined with a relatively large error bar, may be weighted with a lower weight as compared to blocks with a high image quality, for which the sub-frequency can be determined with a relatively small error bar. Furthermore, should a first block comprise a larger number of biometric characteristics as compared to a second block, the sub-frequency may be determined with higher accuracy for the first block as compared to the second block. In such cases, the first block may be weighted with a higher weight in the averaging process than the second block. As the mean intensity of a block may be related to the number of biometric characteristics in a block, the mean intensity of a block may be a suitable parameter for setting the weight and increasing the accuracy of the determination process of the first frequency.

It can be provided in an embodiment that determining the sub-frequency for the at least one block further comprises obtaining a modulus of a first output obtained, applying a non-linear function to the modulus of the first output to obtain a second output, applying a mask, such as a frequency response of a band pass filter, to the second output, normalizing the masked second output to obtain a normalized power spectrum matrix $P_{norm}$ [i, j] as a third output, and calculating a sum over a product of the third output and a distance between a matrix element (i, j) of the normalized power spectrum matrix $P_{norm}$ [i, j] and (0,0). As described above, optionally, determining the sub-frequency for the at least one block can be based on a Fourier transformation. Furthermore, it can optionally be provided that the first output described above is obtained by the Fourier transformation. It can also be provided that the sub-frequency can be determined by any other suitable method for determining the sub-frequency for at least one of the blocks. In this case, also the first output can be obtained from the respective method for determining the sub-frequency.

By using the above-described method, the sub-frequency can be determined with increased accuracy, which in turn increases the accuracy with which the first frequency can be determined. Errors in the determination process of the first frequency can thus be minimized and the accuracy of the method can be improved.

When the modulus of the first output is obtained by the Fourier transformation, the modulus can be directly related to the amplitude of the Fourier transformation. Other information of the first output of the Fourier transformation, such as a phase, may be disregarded. By applying a non-linear function to the modulus of the Fourier transformation, the spectral details of the Fourier transformation relating to the biometric characteristics may be further enhanced. Applying a non-linear function may, for instance, comprise raising the modulus to a power of n, where n may be any integer larger than zero. For instance, n may take a value of 2 or 3 or any other integer number. By applying a band pass filter as a mask, frequencies in the Fourier spectrum that do not relate to the biometric characteristic may be discarded and thus the accuracy of the method may be further increased. By calculating a sum over the product between the normalized power spectrum matrix $P_{norm}$ [i, j] and a distance between the matrix element (i, j) of the normalized power spectrum matrix $P_{norm}$ [i, j] and (0,0), the sub-frequency of the respective block can be determined.

In an embodiment, determining the sub-frequency for the at least one block comprises decomposing the image such that each of the n×m blocks has a size of k×l pixels and determining an average orientation of at least part of the biometric characteristics of the at least one block. Optionally, it can be provided that the sub-frequency for the at least one block is determined based on the density of the at least part of the biometric characteristics comprised in the at least one block.

By decomposing the image in n×m blocks, whereby each block has a size of k×l pixels, an image comprising biometric characteristics with an irregular form factor, such as fingerprint ridges, can be decomposed such that the form factor of a part of the biometric characteristic comprised in a block can be approximated by a straight line, which facilitates a more precise determination of the first frequency as compared to if the image were not decomposed into the n×m blocks. The size of a block can thereby be flexibly determined based on the form factor of the biometric characteristic. Specifically, the size of a block may be chosen such that the part of the biometric characteristic can be approximated by a straight line, which in turn allows for a reliable determination of the average orientation. By taking into account the average orientation of the at least part of the biometric characteristics of the at least one block, the first frequency can be determined with increased accuracy. Furthermore, the size of the blocks may be dynamically determined based on ridge frequency variations across blocks. With this, also for images with varying ridge frequencies, the different frequencies may be determined with increased accuracy.

In a more specific embodiment it can be provided that determining the sub-frequency further comprises rotating the at least one block based on the determined average orientation of the at least part of the biometric characteristics of the at least one block. It can, for instance, be provided that the at least one block is rotated based on the determined average orientation of the block such that the average orientation of each block is aligned along a preferential direction. For instance, the blocks can be rotated such that the average orientation is aligned horizontally or vertically in the image. By rotating the at least one block based on the determined average orientation, the first frequency can be determined with increased accuracy.

In an embodiment, determining the sub-frequency further comprises reducing intensity information stored in the at least one block by calculating a mean intensity for each column I of the at least one block and storing in an array the reduced intensity information of the at least one block. In this way, for each column of the block an average value can be obtained, which describes the proportion of pixels in the column, and which comprises a biometric characteristic. With this information, starting and ending points of biometric characteristics in the block may be identified. Based on the starting and ending points of a biometric characteristic, a distance between the biometric characteristics may be determined.

In a more specific embodiment, it can be provided that determining the sub-frequency further comprises determining at least one distance between biometric characteristics in the at least one block based on the reduced intensity information stored in the array, averaging over the at least one distance to obtain an average distance and inverting the average distance to obtain the sub-frequency. By averaging over a large number of distances, the average distance can be determined with high accuracy.

In an embodiment, the resized image is provided to an identification device, which identifies a user based on the resized image. As the resized image can be resized with high accuracy to a specific target resolution, the resized image facilitates a reliable and safe identification of a user, which may be of particular relevance when granting access to security relevant information or processes.

According to the present disclosure, a computing device comprising a processor and a storage device is also provided, wherein computer readable instructions are stored on the storage device, which when executed causes the computing device to perform the method according to any of the embodiments discussed above.

With the computing device according to the present disclosure, an image comprising at least one biometric identifier can be resized with high accuracy to an arbitrary image resolution. Therefore, the image comprising the biometric identifier can be resized with high accuracy to a target image resolution, such as a target resolution of a reference biometric identifier, which in turn allows for a reliable comparison between the biometric identifier of the resized image and a reference biometric identifier in order to ensure, for instance, a reliable identification of a user.

FIG. 1a shows an image 101 that is resized 104 into a resized image 105 according to an embodiment 100.

According to the present disclosure, the image 101 comprises at least one biometric identifier 102, wherein the biometric identifier comprises a plurality of biometric characteristics 103.

In the embodiment described in the context of FIG. 1a, the biometric identifier 102 is a fingerprint and the biometric characteristic 103 is a fingerprint ridge. The biometric identifier 102 and the biometric characteristic 103 are, however, not limited in this regard, such that the biometric identifier can also be a palm of a hand and the biometric characteristic 103 a minutiae of the palm.

The image 101 can, for instance, be an image 101 obtained from a camera of a mobile computing device, such as a tablet, a smartphone or a laptop, or any other computing device, such as desktop computer or a server. The image 101, however, does not necessarily have to be obtained directly from a camera but also can, for instance, be obtained from an intermediary device such as a storage unit of another computing device or a storage device. The image 101 can also be obtained from any other source.

According to the present disclosure, the image 101 is resized 104 to a resized image 105. Resizing the image 101 may comprise resizing the image 101, such that the resized image 105 has a specific image resolution. The specific image resolution of the resized image 105 may, for instance, be a standard image resolution that is used in identification processes. The specific resolution may, for instance, be a resolution of 500 dpi or any other resolution. With the method according to the present disclosure, images can be accurately resized to the specific target resolution which is, for instance, key for a reliable identification process when the resized image is to be compared with a reference biometric identifier.

Should the biometric identifier be a fingerprint and the biometric characteristic a ridge of the fingerprint, the specific resolution may, for instance, be a standard resolution of a standard fingerprint scanner.

Figure 1B:
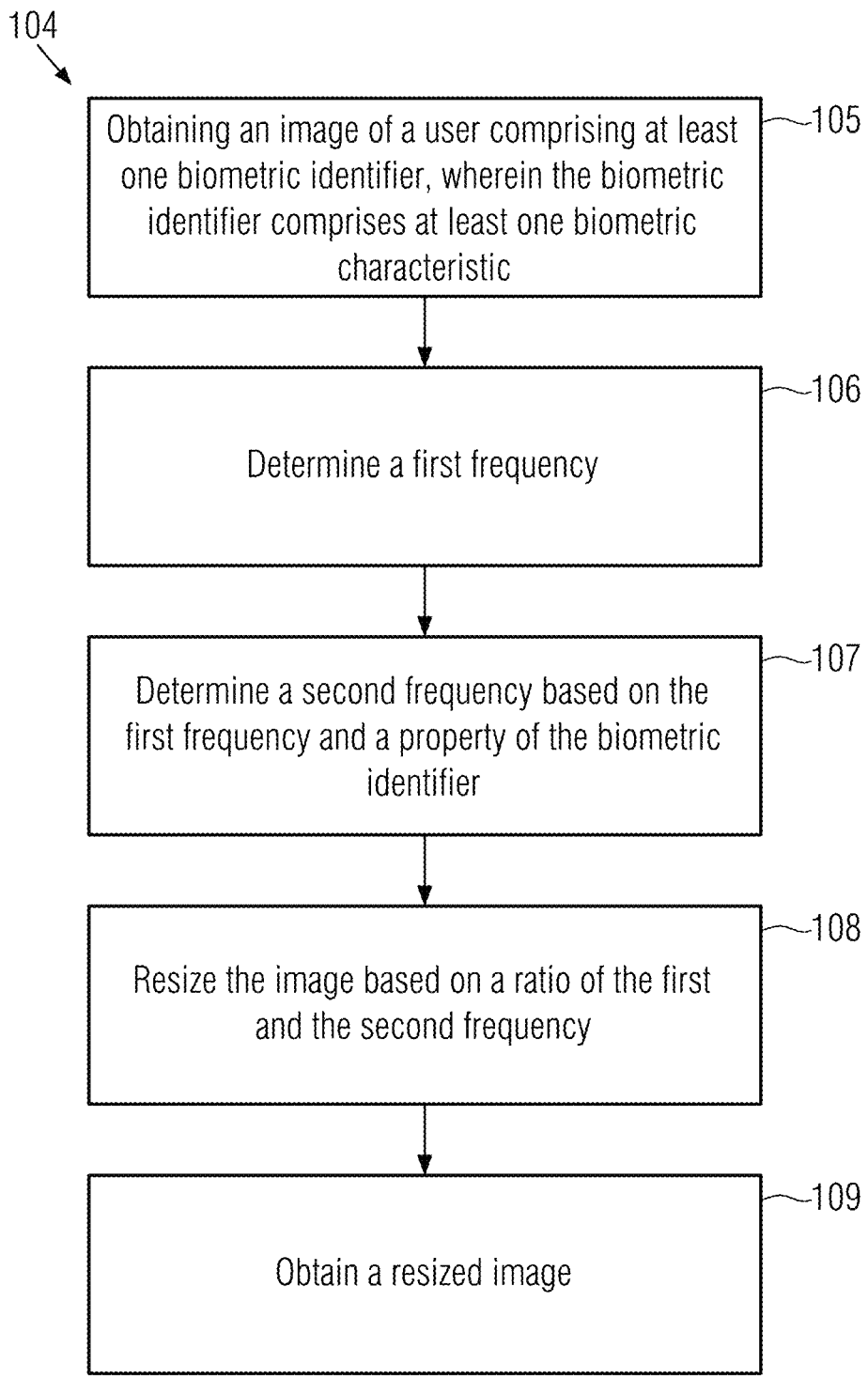
FIG. 1b is a flowchart of a method for resizing an image, according to an embodiment.

The resizing 104 of the image 101 to the resized image 105 detailed above is described in further detail in the context FIG. 1b, which shows a flow chart of a method 104 for resizing an image according to an embodiment.

In a first operation 105, the method 104 obtains an image of a user comprising at least one biometric identifier, wherein the biometric identifier comprises a plurality of biometric characteristics. The image can, for instance, be the image 101 described in the context of FIG. 1a.

After the image has been obtained in operation 105, it can optionally be provided that a detection and segmentation of the at least one biometric identifier comprised in the image is performed. The detection and segmentation of the at least one biometric identifier can, for instance, comprise confining each biometric identifier in a rectangular box and performing a quality check of each biometric identifier. If the image only comprises a single biometric identifier, the single biometric identifier may be confined in a box and then the quality check is performed on the single biometric identifier.

The quality check can, for instance, comprise analyzing the biometric identifier contained in each box by means of a signal-processing algorithm and determining a number of biometric characteristics, which the biometric identifier comprises. It can, for instance, be provided that the biometric identifier is disregarded by the method 104 if the number of biometric characteristics comprised in the biometric identifier is lower than a biometric characteristic threshold value.

Should the number of biometric characteristics be larger than the biometric characteristic threshold value, the biometric identifier may be provided to a neural network or a deterministic algorithm, in order to crop the biometric identifier comprised in the box. The neural network or the deterministic algorithm may specifically analyze a contour of the biometric identifier in order to perform the cropping process. Cropping of the biometric identifier may comprise separating the biometric identifier from the background comprised in the box and rotating the biometric identifier, such that the biometric identifier is aligned along a preferential direction.

Afterwards, an optional three-dimensional correction of the biometric identifier may be performed. Such three-dimensional correction may correct errors in the image that arise when an image is taken by a camera sensor with a certain distance between camera sensor and biometric identifier. For instance, if the biometric identifier is a fingerprint of a fingertip and an image of the fingertip is taken by a camera from a certain distance, due to the curved three-dimensional nature of the fingertip, the different surface elements of the fingertip that are captured by a sensor of the camera have different distances to the sensor of the camera. In consequence, for instance, parts of the fingertip whose surface normal vector is not aligned parallel to an optical axis of the sensor may be compressed in the image as compared to parts of the fingertip whose surface normal vector is parallel to the optical axis of the camera. In this case, for instance, distances between fingerprint ridges in certain regions of the fingertip appear smaller on the taken image as compared to distances between fingerprint ridges in other regions of the fingertip. To compensate for such an error induced by the three-dimensional nature of the biometric identifier, a geometrical model (for example to approximate the three-dimensional shape of the finger) may be employed by means of which the above-indicated errors can be corrected.

Next, by optionally comparing the at least one biometric identifier with a reference biometric identifier, which may, for instance, be stored in a database, the width of the at least one biometric identifier can be rescaled to match a width of the respective reference biometric identifier. The width may thereby be specific for the type of biometric identifier. If the original image comprised, for instance, a hand of a user, at least one fingertip of the hand may be segmented and three-dimensionally corrected as described above and each fingerprint of the at least one fingertip may be compared to a respective reference fingerprint stored in the database, and the width of each of the fingerprints may be rescaled to match a specific width of the reference fingerprint stored in the database.

The so obtained at least one biometric identifier may then be stored in at least one processed image.

It can furthermore be provided that the at least one processed image is transformed into a binary image. By transforming the processed image into a binary image, contrast of the image can be increased, which in turn allows for a more accurate determining of details in the image, such as the biometric characteristics, therefore facilitating a more accurate resizing of the image and matching of the frequency.

Alternatively, it can also be provided that the method for resizing the image obtains an image that has already been processed according to the operations described above. It may also be provided that the method obtains an image that has only been processed by part of the above described operations. In this case, it can be provided that the method only applies to a selection of the above described processing operations to the image. It can also be provided that the method obtains an image where additional optional processing operations other than the above described have been applied. Furthermore, it can be provided that no processing operations are to be performed on the obtained image.

After the image comprising at least one biometric identifier has been obtained and optionally after the above described processing operations have been performed on the image, in operation 106 a first frequency of at least part of the plurality of the biometric characteristics in the image is determined. Optionally, the first frequency can be determined based on a Fourier transformation on at least part of the image or based on a density of the at least part of the biometric characteristics in the image. Alternatively, also other approaches for determining the first frequency, such as autocorrelation across a direction of maximal variability or mean subtraction followed by zero-crossing count may be employed. The just mentioned methods for determining the first frequency are to be considered exemplary and not limiting. Also any other suitable method for determining a frequency of the biometric characteristics in the image, such as a spatial frequency of the biometric characteristics in the image, is conceivable.

In the following, for exemplary reasons, the determination of the first frequency is only discussed for the two cases, where the first frequency is either determined based on a Fourier transformation on at least part of the image or where the first frequency is determined based on a density of the at least part of the biometric characteristics. It is noted that the techniques described below may be also used in relation with other methods for determining the first frequency accordingly. The method is therefore not limited to the cases, where the first frequency is determined by a Fourier transformation or the density of the at least part of the biometric characteristics in the image. Also any other suitable method for determining the first frequency may therefore be used in accordance with the approaches discussed below.

The Fourier transformation can, for instance, be a 2D Fourier transformation.

If a distribution of the biometric characteristics comprised in the image shows a specific periodicity, the periodicity can be reflected in the first frequency that can, for instance, be determined by the Fourier transformation. As biometric characteristics of biometric identifiers, such as ridges of a fingerprint or minutiae of a palm, are typically distributed with a certain periodicity over the respective biometric identifier, a Fourier transformation is suited to characterize the biometric characteristics. However, as outlined above also any other suitable approach for determining a frequency and specifically a spatial frequency is conceivable.

Alternatively, the first frequency can also be determined based on the density of the at least part of the biometric characteristics in the image. The density of the at least part of the biometric characteristics can be understood as a number of biometric characteristics comprised in a section of the image normalized to the size of the section of the image. The section of the image can thereby comprise the whole image or only part of the image. The size of the image may, for instance, be provided in units of pixels. As described above, the biometric characteristics are typically distributed with a certain periodicity over the respective biometric identifier. Therefore, by determining the density of the biometric characteristics, a distance between the biometric characteristics can be determined. From the distance, the first frequency can in turn be determined.

It can be provided that determining the first frequency comprises decomposing the image into n×m blocks. By decomposing the image into n×m blocks, it can be provided also that should the biometric characteristics have an irregular form factor, such as a form factor that deviates from a straight line, the first frequency can be determined with sufficient accuracy. Specifically, by dividing the image into a number of sufficiently small blocks, biometric characteristics with an irregular form factor, such as fingerprint ridges, can be decomposed such that a part of the biometric characteristic comprised in a block can be approximated by a straight line, which facilitates for a more precise determination of the first frequency.

If the image has been decomposed into n×m blocks, it can be provided that determining the first frequency further comprises determining a sub-frequency for at least one of the blocks based on a Fourier transformation on the at least one block or based on a density of at least part of the biometric characteristics comprised in the at least one block and averaging over the determined at least one sub-frequency to obtain an average sub-frequency. By determining a sub-frequency for at least one block and by averaging over the determined at least one sub-frequency, the first frequency can be determined with higher accuracy as compared to the case where the first frequency is directly determined.

Averaging can thereby simply comprise calculating a sum over the determined sub-frequencies, and normalizing this sum by the number of sub-frequencies.

However, the above described averaging can also comprise associating each of the determined at least one sub-frequency with a weight and averaging over the at least one sub-frequency based on the associated weight, wherein optionally the weight is determined based on a mean pixel intensity of the respective block.

It can, for instance, be provided that blocks with a poor image quality, for which the sub-frequency can only be determined with a relatively large error bar, are weighted with a lower weight as compared to blocks with a high image quality, where the sub-frequency can be determined with a relatively small error bar.

Furthermore, should a first block comprise a larger number of biometric characteristics as compared to a second block, the sub-frequency can be determined with higher accuracy for the first block as compared to the second block. The first block may therefore be weighted with a higher weight in the averaging process than the second block. As the mean intensity of a block may be related to the number of biometric characteristics in a block, the weight for a block may be determined based on a mean intensity of the block.

Figure 2:
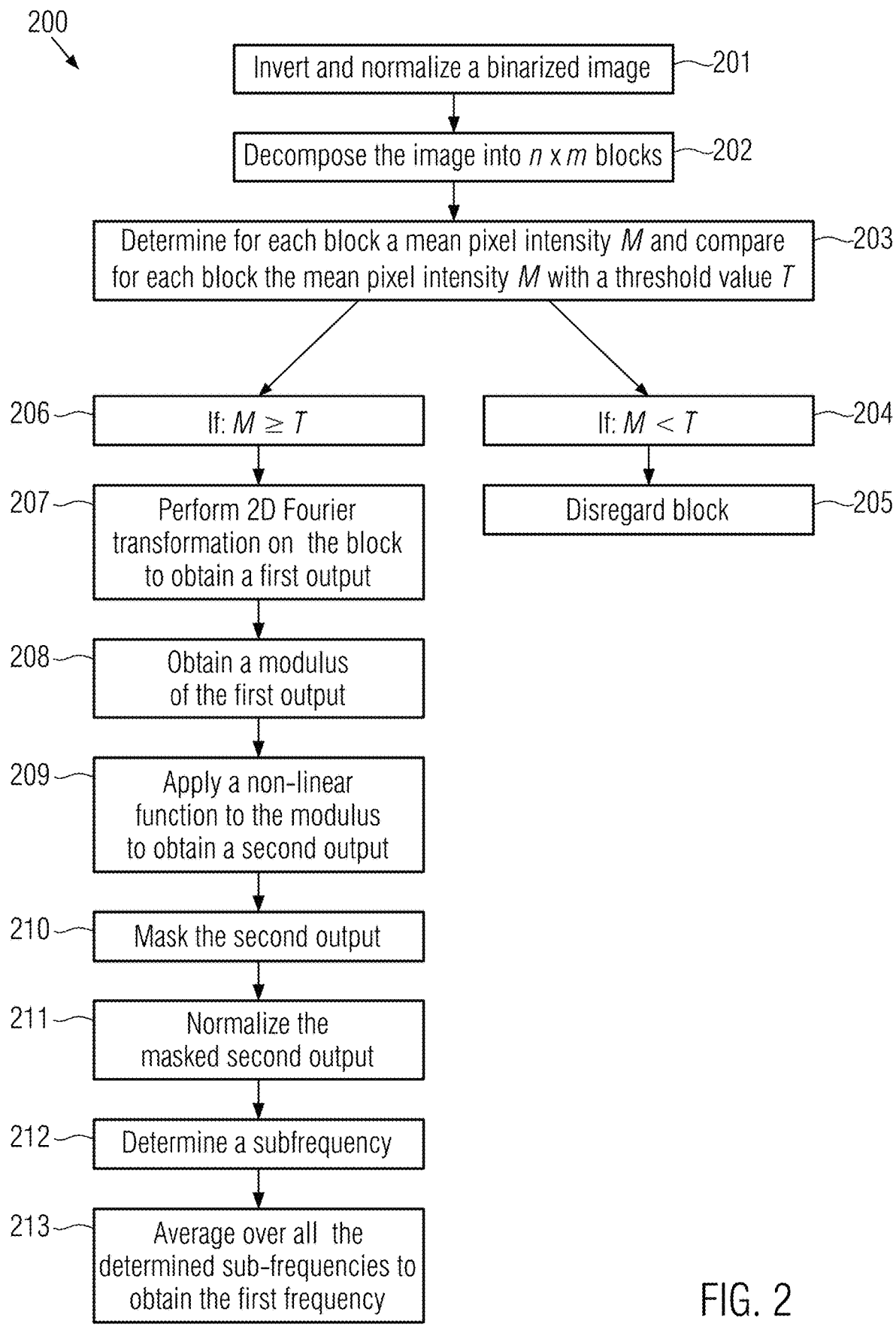
FIG. 2 is a flowchart of a method for determining a first frequency based on a Fourier transformation on at least part of biometric characteristics in an image, according to an embodiment.
Figure 3:
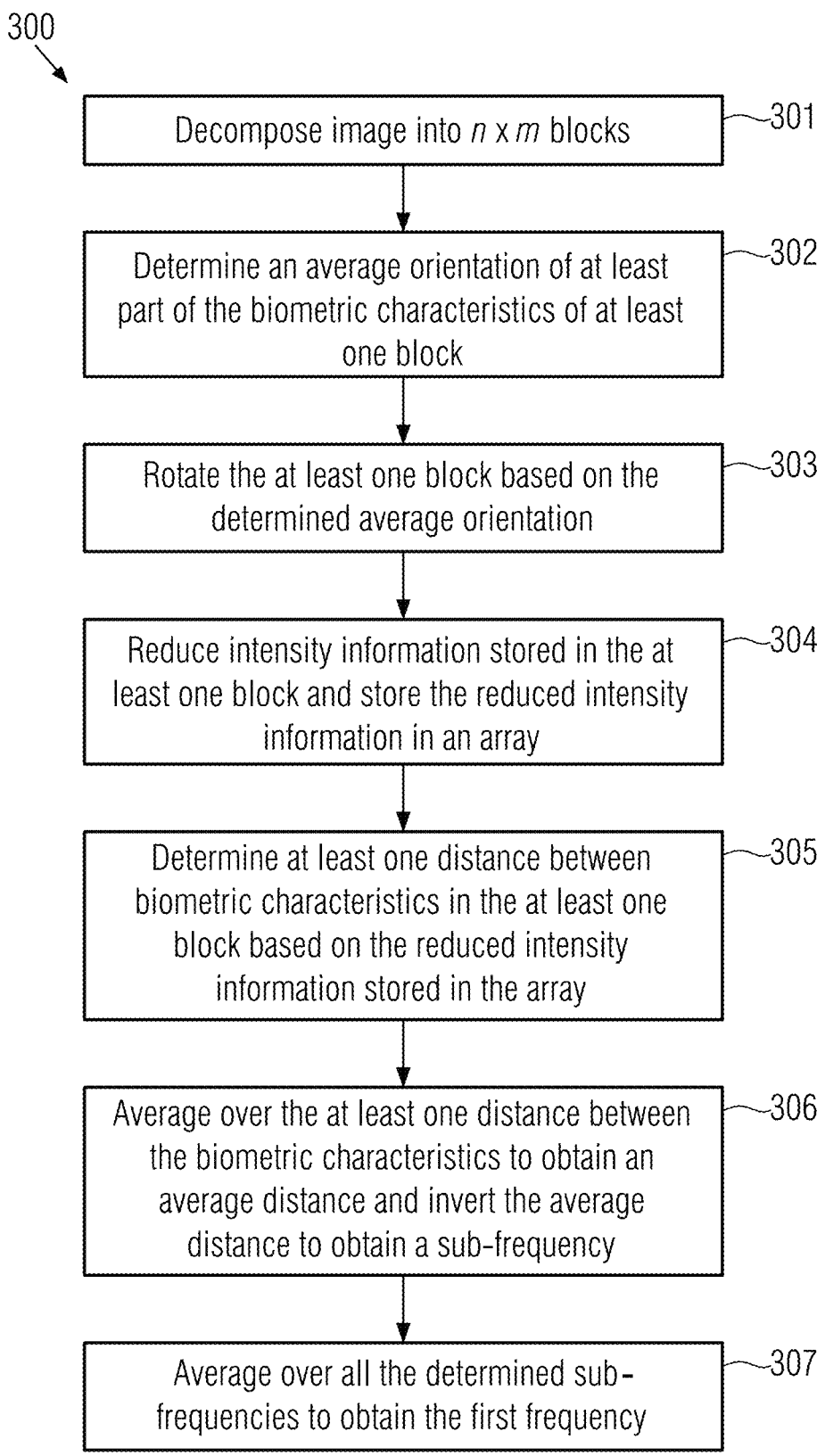
FIG. 3 is a flowchart of a method for determining a first frequency based on a density of at least part of biometric characteristics in an image, according to an embodiment.

A more specific embodiment of the approach for determining the first frequency based on the Fourier transformation is discussed in more detail in the context of the embodiment of FIG. 2, while a more specific embodiment of the approach for determining the first frequency based on a density of the at least part of the biometric characteristics is discussed more in detail in the context of the embodiment of FIG. 3.

After determining the first frequency, in operation 107 a second frequency is determined based on the first frequency and a property of the biometric identifier.

The property of the biometric identifier can, for instance, be a dimension of the biometric identifier or be related to a dimension of the biometric identifier. The property of the biometric identifier can also comprise information about the user the biometric identifier is being associated with. The information can, for instance, comprise information about the gender, age and/or ethnicity of the user. The property of the biometric identifier is, however, not limited to the just mentioned examples and can also comprise any other user related information.

It can for instance, be provided that the property of the biometric identifier is an aspect ratio of the biometric identifier. The aspect ratio of the biometric identifier can, for instance, be an aspect ratio of the optionally cropped biometric identifier, i.e., the biometric identifier that has been confined in a rectangular box, separated from its background and rotated, such that the biometric identifier is aligned along a preferential direction. It can furthermore be provided that the aspect ratio of the biometric identifier is an aspect ratio of the cropped biometric identifier, whose width has been rescaled to match a width of a respective reference biometric identifier.

By taking into account the aspect ratio of the biometric identifier, for instance, errors induced by the rescaling of the width, which may, for instance, result in an over- or underestimation of the first frequency, can be corrected. The so determined second frequency represents a prediction of the frequency the same biometric identifier in an image captured under reference conditions would have.

If the biometric identifier is, for instance, a fingerprint and the biometric characteristic is, for instance, a fingerprint ridge, a rescaling of a fingerprint that has a larger width than a reference fingerprint results in a compression of the fingerprint along a horizontal direction. This compression also results in a compression of the distance between the ridges of the fingerprint in the horizontal direction. Consequently, when determining the first frequency of the fingerprint ridges of an accordingly rescaled fingerprint, the compression of the distance between the ridges may result in an overestimation, i.e., a larger value of the first frequency, as compared to the first frequency that would have been determined on the fingerprint before rescaling. Similarly, when the fingerprint has a width smaller than the reference fingerprint, the fingerprint is stretched during the rescaling process along the horizontal direction, which results in a stretching of the distance between the fingerprint ridges along the horizontal direction. When determining the first frequency of the ridges of an accordingly rescaled fingerprint, the stretching of the distance between the ridges may result in underestimation, i.e., a smaller value of the first frequency, as compared to the first frequency that would have been determined on the fingerprint before rescaling. Therefore, by taking into account the aspect ratio of the fingerprint, an error in the first frequency that may arise from a rescaling of the fingerprint can be efficiently corrected.

As described above, also other properties of the biometric identifier, such as gender, age, and/or ethnicity of the user may be used to correct possible errors in the first frequency and to determine the second frequency. Furthermore, the above-described properties of the biometric identifiers may be used to predict the second frequency with a higher accuracy.

It can furthermore be provided that determining the second frequency comprises calculating a regression function of the first frequency and the property of the biometric identifier.

The regression function can be a regression function that has been previously trained on reference data sets of reference biometric identifiers and non-standardized biometric identifiers.

The reference biometric identifiers can, for instance, comprise images of biometric identifiers that have been obtained for a number of users, such as for instance, for 10 users, 100 users, 1000 users or any other number of users, by a standardized biometric identifier capturing device.

The non-standardized biometric identifiers can be obtained from the same users, with the difference that these biometric identifiers have not been obtained by the standardized biometric identifier capturing device described above but by a conventional camera, such as a camera of a mobile computing device or any other computing device. The non-standardized biometric identifiers may, for instance, comprise images of the biometric identifiers of the users that have been taken by placing the respective biometric identifier with a certain distance in front of the camera.

If the biometric identifier is a fingerprint, the standardized biometric identifier capturing device can, for instance, be a standardized fingerprint scanner that can obtain images of fingerprints with a standardized resolution, such as 500 dpi or any other resolution. The standardized fingerprint scanner can be a scanner, which requires a user to place a fingertip on a scanning surface of the fingerprint scanner in order to obtain an image of the fingertip and the respective fingerprint. By placing the fingertip on the scanner, an image of a flat fingertip can be obtained and possible errors in the image that may result from the three-dimensional shape of the fingertip can be excluded. Furthermore, such scanners provide images where a distance between the fingertip and a lens of the scanner, which captures the images, corresponds to a reference distance value. Consequently, by such a scanner, reference images of a fingertip, where the fingertip always has the same distance to the lens can be obtained. Respective images may be collected for different fingers of the users. For each of the so obtained images of the fingertip of the users, a reference frequency may be obtained based on a Fourier transformation or based on a density of the ridges of the fingertip in the image as described above in the context of the first frequency.

The images of the non-standardized biometric identifiers, on the other hand, may be obtained by placing the fingertips of the different fingers of the users with a certain distance in front of a camera. By contrast to the standardized fingerprint scanner, the fingertip is thereby not directly placed onto the camera lens, but the photo is taken with a certain distance between camera lens and fingertip. In this case, a 2D image of a three-dimensional fingertip and the respective fingerprint is obtained. For each of the so obtained images of the fingerprints of the users, a non-standardized frequency may be obtained based on a Fourier transformation or based on the density of the ridges of the fingerprint, as described above in the context of determining the first frequency. However, before determining the non-standardized frequency, one or more of the above described optional processing operations may be performed, which may, for instance, comprise segmenting the biometric identifiers in the image, applying a signal processing algorithm, cropping the fingerprints, performing a three-dimensional correction, rescaling the images to match a width of a respective reference fingerprint, and transforming the image into a binary image.

The operations described above are not limited to fingerprints and fingerprint ridges. An analogous procedure may also be performed for any other biometric identifier and biometric characteristic, such as a palm of a hand and minutiae, for which the reference frequency of the biometric characteristics and the non-standardized frequency can be determined accordingly.

The linear regression can be trained based on the so determined reference frequency $F_{Ref}$, the determined non-standardized frequency $F_{n-s}$, and a property of the biometric identifier P. Reference frequency data, non-standardized frequency data, and the property of the biometric identifier related to a specific user and a specific biometric identifier and biometric characteristic of the user may be used for the training process. By training the linear regression on data of a variety of users, the accuracy of the linear regression may be improved.

The linear regression may thereby be of the form:

$$F_{Ref} = (a*P + b)*F_{n-s} + c \qquad \text{equation (1)}$$

where a, b and c are constants. Based on the training of the linear regression function provided in equation (1), the coefficients a, b and c can be determined. It can also be provided that the regression function comprises further properties of the biometric identifier, such as gender, age or ethnicity. The regression may be further improved when using references and non-standardized frequency data obtained from different biometric identifiers of a single user, such as fingerprints of different fingertips associated with a hand or both hands of the user.

It can also be provided that the linear regression is trained separately on different biometric identifiers belonging to the same user.

By means of the trained linear regression described in equation (1), the second frequency $F_2$ can be determined based on the first frequency $F_1$ and the property of the biometric identifier P by using the formula:

$$F_2 = (a*P + b)*F_1 + c \qquad \text{equation (2)}$$

where a, b and c are the trained parameters as described in the context of equation (1) above and P is the property of a biometric identifier, such as the aspect ratio or any other suitable property of the biometric identifier.

Based on equation (2) for a given frequency $F_1$, the respective frequency $F_2$ can be determined.

In operation 108, the image is then resized based on a ratio of the first $F_1$ and the second frequency $F_2$ and a resized image is obtained. The resized image may be resized to a specific target resolution, such as, for instance, 500 dpi or any other target resolution. As described above, this target resolution may correspond to a standard image resolution that is used for identification processes.

It can, for instance, be provided that resizing the image based on the ratio of the first frequency and the second frequency comprises multiplying the ratio of the first frequency and the second frequency by a width of the image $W_{image}$ comprising the biometric identifier and determining a target width $W_{target}$ by using the relation:

$$W_{target} = \frac{W_{image} * F_1}{F_2} \qquad \text{equation (3)}$$

The image width $W_{image}$ can, for instance, be the width to which the image has been optionally rescaled in order to match a width of the respective reference biometric identifier.

The image can then be resized to the determined target width $W_{target}$ and the resized image can be obtained in operation 109.

In this case, the image resolution of the resized image obtained in operation 109 corresponds to the resolution of the images of the reference biometric identifiers by means of which the linear regression as described in equation (1) has been trained.

By training different linear regressions on images of reference biometric identifiers with different reference image resolutions, the image can be resized to a variety of different target image resolutions by the method 104.

Optionally, the obtained resized image may be used in an identification process of a user. In this case, the resized image may, for instance, be provided to an identification device, which identifies a user based on the resized image. As the above described method for resizing images allows for resizing an image comprising a biometric identifier with high accuracy, errors in the resizing can be effectively prevented and reliable identification of the user by means of the resized image can be facilitated.

FIG. 2 describes a method 200 for determining the first frequency based on a Fourier transformation on at least part of the biometric characteristics in the image, according to an embodiment.

The embodiment discussed in the context of FIG. 2 can be combined with the embodiment discussed in the context of FIGS. 1a and 1b, and may be specifically implemented as operation 106 described in the context of FIG. 1b that pertains to determining the first frequency of at least part of the plurality of the biometric characteristics in the image based on a Fourier transformation.

Method 200 may therefore be performed after the image has been obtained as described in operation 105 of FIG. 1b.

The image may have been optionally processed by one of the optional steps described in FIG. 1b, such as segmentation of the biometric identifier, cropping, three-dimensional correction, rescaling and/or binarization.

If the obtained image as described in FIG. 1b has not been binarized, the method 200 can optionally comprise a step of binarizing the image.

In operation 201 of method 200, an inversion and normalization of the pixel color values of the binarized image is performed. For instance, if the background of the binarized image is represented by white pixels and the biometric characteristics by black pixels, the inverted image background is therefore represented by black pixels and the biometric characteristics by white pixels. Furthermore, in the case where the white pixels of the image are represented by a color value of 255 and the black pixels are represented by a color value of 0, it can be provided that the pixel color values are normalized by a value of 255, such that in the normalized inverted image white pixels are represented by a color value of 0 and black pixels by a color value of 1.

In the following operation 202, which has also already been discussed in the context of FIG. 1b, the method comprises decomposing the image into n×m blocks. Each block can thereby comprise a number of a×b pixels, such as 32×32 pixels or any other suitable number of pixels.

In operation 203, the mean pixel intensity M of a block, i.e., the sum over the intensity of the pixels comprised in a block divided by the number of pixels in the block, is determined. The mean pixel intensity M of a block is then compared to a threshold value T, such as 0.05 or any other threshold value.

If it is determined that the mean pixel intensity of a block is lower than the threshold value T at operation 204, the respective block may be disregarded in the succeeding operation 205.

If the mean pixel intensity of a block is larger or equal to the threshold value T at operation 206, then the operations 207-213 as described below are performed on the respective block.

The above described comparison between the mean pixel intensity M and the threshold value T can be performed for each of the n×m blocks.

Optionally, before executing operation 207, further processing operations may be performed on the respective blocks in order to avoid a concentration of energy at low and high frequencies and to increase the spectral resolution of the respective blocks. These operations may comprise DC removal, windowing and zero padding. Zero padding may thereby comprise padding a block with zeros until the block comprises a number of i×j pixels. For instance, if the number of pixels of the block has been 32×32 before performing the optional zero padding, the number of pixels may be increased to 64×64 after zero padding.

In operation 207, a 2D Fourier transformation is performed on the a×b or the i×j pixels of each of the blocks that fulfill the condition specified in operation 206. This yields a Fourier spectrum P' [a, b] or P' [i, j] as a first output for each of the respective blocks, depending on whether the optional zero padding has been performed or not. In the following, the power spectrum P' [i, j] will be used for reasons of clarity. However, the steps can also be accordingly performed by using the power spectrum P' [a, b].

In operation 208, the method 200 comprises obtaining a modulus of the first output. This yields the power spectrum P [i, j]. A phase of the first output is not necessary for the subsequent steps of the method 200 and may therefore be disregarded.

In operation 209, a non-linear function is applied to the modulus of the first output to obtain an enhanced power spectrum as a second output, $P_{enh}$ [i, j]. The non-linear function may thereby be of the form:

$$P_{enh}[i, j] = P[i, j]^\beta \qquad \text{equation (4)}$$

where $\beta$ is real number larger than 0. It can, for instance, be provided that $\beta$ takes a value of 1.5, 2, 2.5, 3, 3.5, 4, 4.5 or 5. However, $\beta$ may also take the value of any other real number larger than 0.

In operation 210, the second output $P_{enh}$ [i, j] is multiplied by a predefined mask B [i, j] and a masked power spectrum $P_m$ [i, j] is obtained, whereby $$P_m[i, j] = P_{enh}[i, j] \times B[i, j] \qquad \text{equation (5)}$$

The mask B [i, j] can, for instance, be the frequency response of a band pass filter. By multiplying the second output with the predefined mask, frequencies that do not correspond to biometric characteristics can be discarded and the accuracy of the determination of the first frequency further improved.

In operation 211, the masked power spectrum $P_m$ [i, j] is normalized and a normalized power spectrum $P_{norm}$ [i, j] is obtained for each of the respective blocks as a third output, whereby $$P_{norm}[i, j] = \frac{P_m[i, j]}{\sum_{i,j} P_m[i, j]} \qquad \text{equation (6)}$$

In operation 212, a sub-frequency for each of the respective blocks is determined. To derive the sub-frequency, the sum over the distance of each spectral bin (i, j), i.e., a matrix element of the normalized power spectrum matrix, and (0, 0) is multiplied by the respective normalized power spectrum matrix. This yields a sub-frequency $F_s$ for the respective blocks, whereby $$F_S = \sum_{i,j} P_{norm}[i, j]\sqrt{i^2 + j^2} \qquad \text{equation (7)}$$

In this way, a sub-frequency may be determined for each block.

As already described in the context of FIG. 1b, the so determined sub-frequencies may then be averaged and the first frequency may be determined as that average of the determined sub-frequencies.

The above described averaging can also comprise associating each of the determined at least one sub-frequency with a weight and averaging it over the at least one sub-frequency based on the associated weight, wherein optionally the weight is determined based on a mean pixel intensity of the respective block.

The so determined first frequency can then be used to perform operations 107-109 as described in the context of FIG. 1b, and the resized image obtained.

FIG. 3 describes a method 300 for determining the first frequency based on a density of at least part of the biometric characteristics in the image according to an embodiment 300.

The embodiment discussed in the context of FIG. 3 can be combined with the embodiments discussed in the context of FIGS. 1a and 1b.

Like in method 200, also in method 300 an image may be obtained, which may, as described in FIG. 1b, have been optionally processed by one of the optional operations such as segmentation of the biometric identifier, cropping, three-dimensional correction, rescaling and/or binarization, before performing the steps described below on the image in order to obtain the first frequency based on the density of at least part of the biometric characteristics.

If the obtained image has not been binarized, the method 300 can optionally comprise an operation of binarizing the obtained image. In this regard it is referred to the embodiment described in FIG. 1b.

In operation 301, the image is decomposed into n×m blocks. This step has already been discussed in the context of FIG. 1b, which is at this point referred to for further details. The image may thereby be decomposed such that each of the n×m blocks has a size of k×l pixels. The size of a block may thereby be dynamically determined based on the biometric identifier and the biometric characteristic in the image. It can, for instance, be provided that the size of a block is 32×32 pixels. However, the block size is not limited in this regard so any other block size is also possible.

In operation 302, an average orientation of at least part of the biometric characteristics of at least one block is determined. The average orientation may be an average orientation vector of the at least part of the biometric characteristics in the block. Determining the average orientation vector may comprise calculating the sum over the orientation vectors of at least part of the biometric characteristics in the block. The orientation is, however, not limited in this regard. The orientation may also be an angle related to each of the at least part of the biometric characteristics in the block. The average orientation may then be calculated as the average of the set of orientation angles determined for the block.

In operation 303, the at least one block is rotated based on the determined average orientation of the biometric characteristics of the block. Rotating the block can comprise aligning the determined average orientation of the block along a preferential direction. The preferential direction may, for instance, be a horizontal or a vertical direction with respect to the obtained image. However, the preferential direction is not limited in this regard and can also be any other direction.

In operation 304, intensity information stored in the at least one block is reduced by calculating a mean intensity for each column I of the at least one block and storing the reduced intensity information of the at least one block in an array.

If the block has a size of k×l pixels, this will result in array having l entries, whereby each entry of the array describes a mean intensity of the respective column l. For a block with a size of 32×32 pixels, the array will thus have 32 entries.

Since the image is binarized before performing the method 300, the pixels of the image may correspond either to black or white pixels. The black pixels may be represented by a color code 0 and the white pixels may be represented by a color code 255. Consequently, if each pixel of a specific column/depicts a biometric characteristic, each pixel may be represented by a color code 255 and the mean intensity may correspond to 255. If the pixels of a column do not depict a biometric characteristic (which may be the case, when all pixels in that column only depict a background), all pixels of that specific column may be represented by a color code 0 and the mean intensity of that specific column in this case is 0. If a column comprises, for instance, a break between two biometric characteristics, such as a break between two ridges, then the column comprises black and white pixels, i.e., pixels represented by a color code 0 and pixels represented by a color code 255. In this case, the mean intensity of that column will take a value in between 0 and 255.

In operation 305, based on the reduced intensity information stored in the array at least one distance between biometric characteristics in the at least one block is determined.

In order to determine the distance between biometric characteristics in a block, a threshold value T may be set and may be compared with the indices of the array determined in operation 304 to determine a starting point and an ending point of a biometric characteristic, such as a fingerprint ridge, in the array. If the black pixels are represented by a color code 0 and the white pixels are represented by a color code 255, the threshold value T can be any value in the range [0, 255]. The threshold value may, for instance, be set to a value of 128. However, any other threshold value in the provided range is also possible.

In order to determine the starting and the ending points of the biometric characteristics, the array indices, i.e., the different elements of the array, are compared in ascending order, i.e., starting from the first element of the array and going through the array until the last array element is reached, with the threshold value T.

It can thereby be provided, that an index $x_i$ of the array corresponds to an ending point of a biometric characteristic if a value of the index $x_i$ is larger than the threshold value T and a value of the preceding index $x_{i-1}$ is smaller than the threshold value, i.e., a change from a value below to a value above the threshold value T occurs for two neighboring elements of the array when going from left to right through the array. It can furthermore be provided that an index $x_i$ of the array corresponds to a starting point of a biometric characteristic if a value of the index $x_i$ is smaller than the threshold value T and a value of the preceding index $x_{i-1}$ is larger than the threshold value T, i.e., a change from a value above to a value below the threshold value T occurs for two neighboring elements of the array when going from left to right through the array. This specific definition of starting and ending point of the biometric characteristic is to be considered exemplary. It can, for instance, also be provided that an ending point is defined as a change from above to below the threshold value and a starting point may be defined as a change from below to above the threshold value.

To explain the determination process in more detail, it is assumed in the following that the image is decomposed into blocks of an exemplary size of 16×16 pixels. This size is to be considered exemplary and the explanations provided below may be analogously applied to any other block size of k×l pixels.

If a block size is 16×16 pixels, the intensity information stored in a block may be reduced according to operation 304 to an array of size 16. An exemplary array may, for instance, read as:

$$A = [10, 11, 0, 1, 6, 44, 255, 240, 200, 190, 1, 3, 6, 0, 200, 225].$$

Starting from the first element of the array, i.e., the leftmost element of the array which has the value 10, each element of the array is compared one after the other and from left to right with the threshold value T, which may, for instance, take an exemplary value of 128. However, any other threshold value in the range [0, 255] is also possible. As already described above, when going through the array from left to right, each time the values of two consecutive indices $x_{i-1}$ and $x_i$ of the array change from below to above the threshold value T=128, the index $x_i$ of the array that is larger than the threshold value may be defined as an ending point of the biometric characteristic. On the other hand, each time the values of two consecutive indices $x_{i-1}$ and $x_i$ of the array change from a value above the threshold value T=128 to a value below the threshold value, the index $x_i$ of the array that is smaller than the threshold value may be defined as a starting point of the biometric characteristic.

In the example provided above, when going through the array from left to right, a first change of two consecutive indices from a value below the threshold value T=128 to a value above the threshold value occurs for the sixth and seventh element of the array, which have the values 44 and 255. Therefore, as explained above, the seventh index of the array, with a value of 255, can be defined as an ending point of the biometric characteristic. A change of two consecutive indices from a value above the threshold value T=128 to a value below the threshold value occurs for the tenth and eleventh index of the array, which have the values 190 and 1. The eleventh index of the array, with a value of 1, can therefore be defined as a starting point of a biometric characteristic. When going further through the array another change of two consecutive indices from a value below the threshold value to a value above the threshold value occurs for the fourteenth and fifteenth index of the array, which have the values 0 and 200. The fifteenth element of the array, with the value of 200, may therefore be defined as another ending point.

This procedure may be analogously performed on any array having a different size than the exemplary array provided above. It can also be provided that the array comprises any other number of starting or ending points of biometric characteristics.

By subtracting the indices of the array of two subsequent ending points from each other, a distance between the ending points can be determined. This distance may, for instance, be expressed in terms of pixels, but can also be recalculated based on the pixel size into units of meters or inches or expressed in any other suitable unit. If the block contains more than one pair of subsequent ending points, a distance for each of the subsequent ending points may be determined and an average over the so determined distances between ending points may be determined.

Analogously, a distance between two starting points can be determined by subtracting the indices of the array of subsequent starting points from each other. If the array contains more than one pair of subsequent starting points, a distance for each pair of subsequent starting points may be determined and an average over the so determined distances between starting points may be determined.

Such averaging over the determined distances is performed in operation 306. The average distance is then inverted to obtain a sub-frequency for the respective block.

In operation 307, it is averaged over all the determined sub-frequencies, i.e., the sub-frequencies determined for each of the blocks of the image, to obtain the first frequency.

As already described in the context of FIG. 1b and FIG. 2, this averaging may simply comprise calculating a sum over the determined sub-frequencies, and normalizing this sum by the number of sub-frequencies. However, the averaging can also comprise associating each of the determined sub-frequencies with a weight and averaging over the sub-frequencies based on the associated weight, wherein optionally the weight is determined based on a mean pixel intensity of the respective block.

The so determined first frequency can then be used to perform operations 107-109 as described in the context of FIG. 1b and a resized image obtained.

Figure 4:
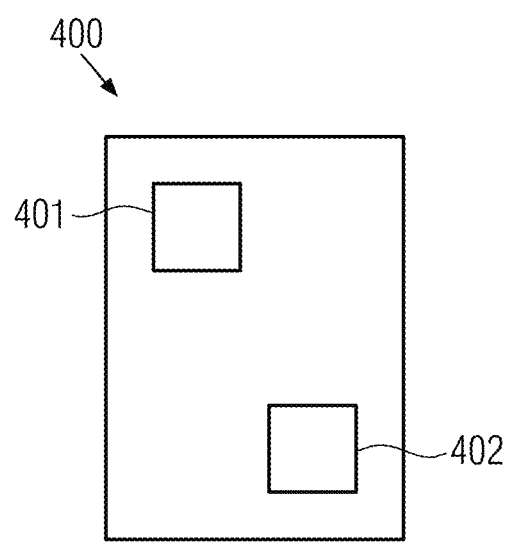
FIG. 4 illustrates a computing device for resizing an image, according to an embodiment.

FIG. 4 shows a computing device 400 comprising a processor 401 and a storage device 402, wherein the computing device is adapted to execute the method according to any of the embodiments as detailed in FIGS. 1a, 1b, 2 and 3. For this purpose, computer readable instructions are stored on the storage device 402, which when executed causes the computing device 400 to perform the method according to any of the embodiments described in the context of FIGS. 1a, 1b, 2 and 3.

The computing device 400 can, for instance, be a mobile computing device such as a smartphone, a tablet or a laptop. However, the computing device is not limited in this regard and can also be any other computing device, such as a desktop computer or a server.

Optionally, the computing device 400 may comprise a camera for obtaining an image of a user comprising at least one biometric identifier. However, the computing device does not necessarily have to comprise a camera for obtaining the image of the user but may also obtain the image from another device, such as another computing device or a storage device. Consequently, the method described in FIGS. 1a, 1b, 2 and 3 does not require complex hardware and may be performed by any standard computing device.

The computing device 400 may furthermore be adapted to use the resized image obtained by the methods described in the context of FIGS. 1a, 1b, 2 and 3 to perform an identification of the user. The computing device 400 may, for instance, comprise an identification device to which the obtained resized image is provided in order to perform an identification process of a user.

It is to be understood that the above description is intended to be illustrative, and not restrictive. Other embodiments will be apparent upon reading and understanding the above description. Although embodiments of the present disclosure have been described with reference to specific example embodiments, it will be recognized that the present disclosure is not limited to the embodiments described, but can be practiced with modification and alteration within the spirit and scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The invention claimed is:

1. A method comprising:
    obtaining an image of a user comprising at least one biometric identifier, wherein the biometric identifier comprises a plurality of biometric characteristics;
    determining a first frequency of at least part of the plurality of the biometric characteristics in the image;
    determining a second frequency based on the first frequency and a property of the biometric identifier;
    resizing the image based on a ratio of the first and the second frequency; and
    obtaining a resized image.

2. The method according to claim 1, wherein the biometric identifier is a fingerprint and the at least part of the plurality of biometric characteristics is a fingerprint ridge.

3. The method according to claim 1, wherein obtaining the image of the user further comprises determining a binary image of the image of the user, and wherein the first frequency is determined on the binary image.

4. The method according to claim 1, wherein determining the second frequency comprises calculating a regression function of the first frequency and the property of the biometric identifier.

5. The method according to claim 1, wherein the property of the biometric identifier is an aspect ratio of the biometric identifier.

6. The method according to claim 1, wherein determining the first frequency comprises decomposing the image in n×m blocks.

7. The method according to claim 6, wherein determining the first frequency further comprises:
    determining a sub-frequency for at least one of the n×m blocks; and
    averaging over the determined at least one sub-frequency to obtain an average sub-frequency.

8. The method according to claim 7, wherein averaging over the determined at least one sub-frequency to obtain the average sub-frequency comprises:
    associating each of the determined at least one sub-frequency with a weight; and
    averaging over the at least one sub-frequency based on the associated weight, wherein optionally the weight is determined based on a mean pixel intensity of the respective block.

9. The method according to claim 7, wherein determining the sub-frequency for the at least one of the n×m blocks further comprises obtaining a modulus of a first output obtained, applying a non-linear function to the modulus of the first output to obtain a second output, applying a mask, such as a frequency response of a band pass filter to the second output, normalizing the masked second output to obtain a normalized power spectrum matrix $P_{norm}$ [i, j] as a third output, and calculating a sum over a product of the third output and a distance between a matrix element (i, j) of the normalized power spectrum matrix $P_{norm}$ [i, j] and (0,0).

10. The method according to claim 7, wherein determining the sub-frequency for the at least one of the n×m blocks comprises decomposing the image such that each of the n×m blocks has a size of k×l pixels and determining an average orientation of at least part of the biometric characteristics of the at least one of the n×m blocks.

11. The method according to claim 10, wherein determining the sub-frequency further comprises rotating the at least one of the n×m blocks based on the determined average orientation of the at least part of the biometric characteristics of the at least one of the n×m blocks.

12. The method according to claim 10, wherein determining the sub-frequency further comprises:
    reducing intensity information stored in the at least one of the n×m blocks by calculating a mean intensity for each column/of the at least one of the n×m blocks; and
    storing in an array the reduced intensity information of the at least one of the n×m blocks.

13. The method according to claim 12, wherein determining the sub-frequency further comprises determining at least one distance between biometric characteristics in the at least one of the n×m blocks based on the reduced intensity information stored in the array, averaging over the at least one distance to obtain an average distance and inverting the average distance to obtain the sub-frequency.

14. The method according to claim 1, wherein the resized image is provided to an identification device, which identifies a user based on the resized image.

15. A computing device comprising a processor and a storage device, wherein computer readable instructions are stored on the storage device, which when executed cause the computing device to perform operations comprising:
    obtaining an image of a user comprising at least one biometric identifier, wherein the biometric identifier comprises a plurality of biometric characteristics;
    determining a first frequency of at least part of the plurality of the biometric characteristics in the image;
    determining a second frequency based on the first frequency and a property of the biometric identifier;
    resizing the image based on a ratio of the first and the second frequency; and
    obtaining a resized image.

16. The computing device according to claim 15, wherein the biometric identifier is a fingerprint and the at least part of the plurality of biometric characteristics is a fingerprint ridge, and wherein the property of the biometric identifier is an aspect ratio of the biometric identifier.

17. The computing device according to claim 15, wherein obtaining the image of the user further comprises determining a binary image of the image of the user, and wherein the first frequency is determined on the binary image.

18. The computing device according to claim 15, wherein determining the second frequency comprises calculating a regression function of the first frequency and the property of the biometric identifier.

19. The computing device according to claim 15, wherein determining the first frequency comprises:
    decomposing the image in n×m blocks;
    determining a sub-frequency for at least one of the n×m blocks; and
    averaging over the determined at least one sub-frequency to obtain an average sub-frequency, wherein the averaging comprises:
        associating each of the determined at least one sub-frequency with a weight; and
        averaging over the at least one sub-frequency based on the associated weight, wherein optionally the weight is determined based on a mean pixel intensity of the respective block.

20. The computing device according to claim 19, wherein determining the sub-frequency for the at least one of the n×m blocks further comprises:
    obtaining a modulus of a first output obtained;
    applying a non-linear function to the modulus of the first output to obtain a second output;
    applying a mask, such as a frequency response of a band pass filter to the second output;
    normalizing the masked second output to obtain a normalized power spectrum matrix $P_{norm}$ [i, j] as a third output;
    calculating a sum over a product of the third output and a distance between a matrix element (i, j) of the normalized power spectrum matrix $P_{norm}$ [i, j] and (0,0);
    rotating the at least one of the n×m blocks based on the determined average orientation of the at least part of the biometric characteristics of the at least one of the n×m blocks;
    reducing intensity information stored in the at least one of the n×m blocks by calculating a mean intensity for each column l of the at least one of the n×m blocks;
    storing in an array the reduced intensity information of the at least one of the n×m blocks; and
    determining at least one distance between biometric characteristics in the at least one of the n×m blocks based on the reduced intensity information stored in the array, averaging over the at least one distance to obtain an average distance and inverting the average distance to obtain the sub-frequency.

* * * * *